United States Patent [19]
Olafsson

[11] Patent Number: 5,742,679
[45] Date of Patent: Apr. 21, 1998

[54] OPTIMIZED SIMULTANEOUS AUDIO AND DATA TRANSMISSION USING QADM WITH PHASE RANDOMIZATION

[75] Inventor: Sverrir Olafsson, Seltjarnarnes, Iceland

[73] Assignee: Rockwell International Corporation, Newport Beach, Calif.

[21] Appl. No.: 699,269

[22] Filed: Aug. 19, 1996

[51] Int. Cl.⁶ .................................................. H04K 1/00
[52] U.S. Cl. ........................................... 380/9; 380/46
[58] Field of Search .................... 380/5, 9, 10, 20, 380/19, 46, 49

[56] References Cited

U.S. PATENT DOCUMENTS

| | | | |
|---|---|---|---|
| 3,936,828 | 2/1976 | Muesse et al. | 343/105 R |
| 4,456,862 | 6/1984 | Yueh | 318/561 |
| 5,172,118 | 12/1992 | Peregrim et al. | 342/25 |

*Primary Examiner*—David C. Cain
*Attorney, Agent, or Firm*—William C. Cray; Philip K. Yu

[57] ABSTRACT

An subsystem processor for converting an input audio signal to complex audio samples for QADM processing by a modem for communication with a remote modem is disclosed. The audio process comprises a decorrelator for processing the input audio to generate a residual signal, an adaptive scaler for adaptively scaling the residual signal to generate a scaled residual signal, a randomizer for phase-randomizing the scaled residual signal to generate a complex signal with randomized phases, and a limiter for limiting the complex signal with randomized phases, such that the complex signal is transmitted by the modem to a remote modem.

24 Claims, 9 Drawing Sheets

Figure 1 Typical Modem with QADM System.

Figure 2 Combining data signal and complex audio signal in baseband.

Figure 3 (a)    Transmitter QADM Processing

Figure 3 (b)    Receiver QADM Processing

Figure 3(c) Transmitter QADM Processing for V.61 Configurations

Figure 3(d) Receiver QADM Processing for V.61 Configurations

Figure 4(a)   Audio Signal Phase Randomization for Complex Signal

Figure 4(b)   Real-to-complex conversion for real input signal

Figure 4(c) Alternative Real-to-Complex Conversion (V.61)

Figure 4(d) Complex-to-Real Conversion (V.61)

Figure 5 Possible Effect of a Correlated Voice Signal.

Figure 6

OPTIMIZED SIMULTANEOUS AUDIO AND DATA TRANSMISSION USING QADM WITH PHASE RANDOMIZATION

FIELD OF THE INVENTION

The present invention relates to multimedia communications over the General Switched Telephone Network (GSTN) using high-speed modems and more particularly relates to the modems for simultaneous audio and data transmission using QADM ("Quadrature Audio/Data Modulation").

BACKGROUND OF THE INVENTION

The basic QADM technology has been proposed to the International Telecommunications Union ("ITU") since 1994 for simultaneous transmission of voice-band audio signals and data over the GSTN. Until its introduction, the only viable method for simultaneous audio and data was to couple three separate technologies: some speech coder, some data multiplexer and some data modem. As proposed and subsequently implemented, the technology uses an extension of echo canceled quadrature amplitude modulation ("QAM") techniques and is compatible with existing data interfaces, startup procedures, data compressions, and applications software. For an introduction to the QADM technology, reference is made to a technical contribution, entitled "Simultaneous Voice and Data on the General Switched Telephone Network using Framed QADM", which was presented by AT&T Paradyne at the SVD Rapporteur's Meeting in Vienna, Austria, Sep. 12–16, 1994, under the auspices of ITU's Telecommunications Standardization Sector. Also, a tutorial on the technology of V.34Q and V.61 specifications, which has been made public at an File Transfer Protocol (FTP) site on the World Wide Web (WWW), at ftp://ftp.std.com/vendors/ATT, entitled Simultaneous Voice and Data (SVD) Technology Pocket Guide, draft V 2.0, will provide further reference to the subject matter underlying the present invention. Both publications are hereby incorporated into the present application by reference.

As can be appreciated by those skilled in the art, QADM is a simple and useful technique for transmitting simultaneous audio and data. However, since it adds the audio component to the data signal as part of the modulation procedure, its presence will affect the performance of the remote receiver. Therefore, care must be taken to avoid any adverse effects. But first, a brief introduction to QADM is desirable.

1. Introduction to QADM.

In QADM, an audio component is transmitted to a receiving modem using the baseband data signal as a "carrier". To the data receiver, the audio component will appear as additive noise, which will be ignored in the decoding procedure. The audio decoder will then retrieve the audio signal from the baseband receiver "noise", or decision error. Thus, in a simple manner, a sampled analog signal can be transmitted in-band with a data signal, and be received with channel impairments such as attenuation and frequency distortion removed.

In its simplest form, an audio signal would be sampled at twice the symbol rate of the data transmission. Then for each data symbol in the complex baseband, two independent samples of audio may be added. However, significant gains in quality may be achieved by segmenting the audio signal into frames, and normalize and decorrelate the audio signal in each frame. Thus information on scaling and correlation in the signal is transmitted separately in digital form as side-information, and the residual signal can better take advantage of its channel by approaching maximum information content per transmitted energy.

Figure 1:
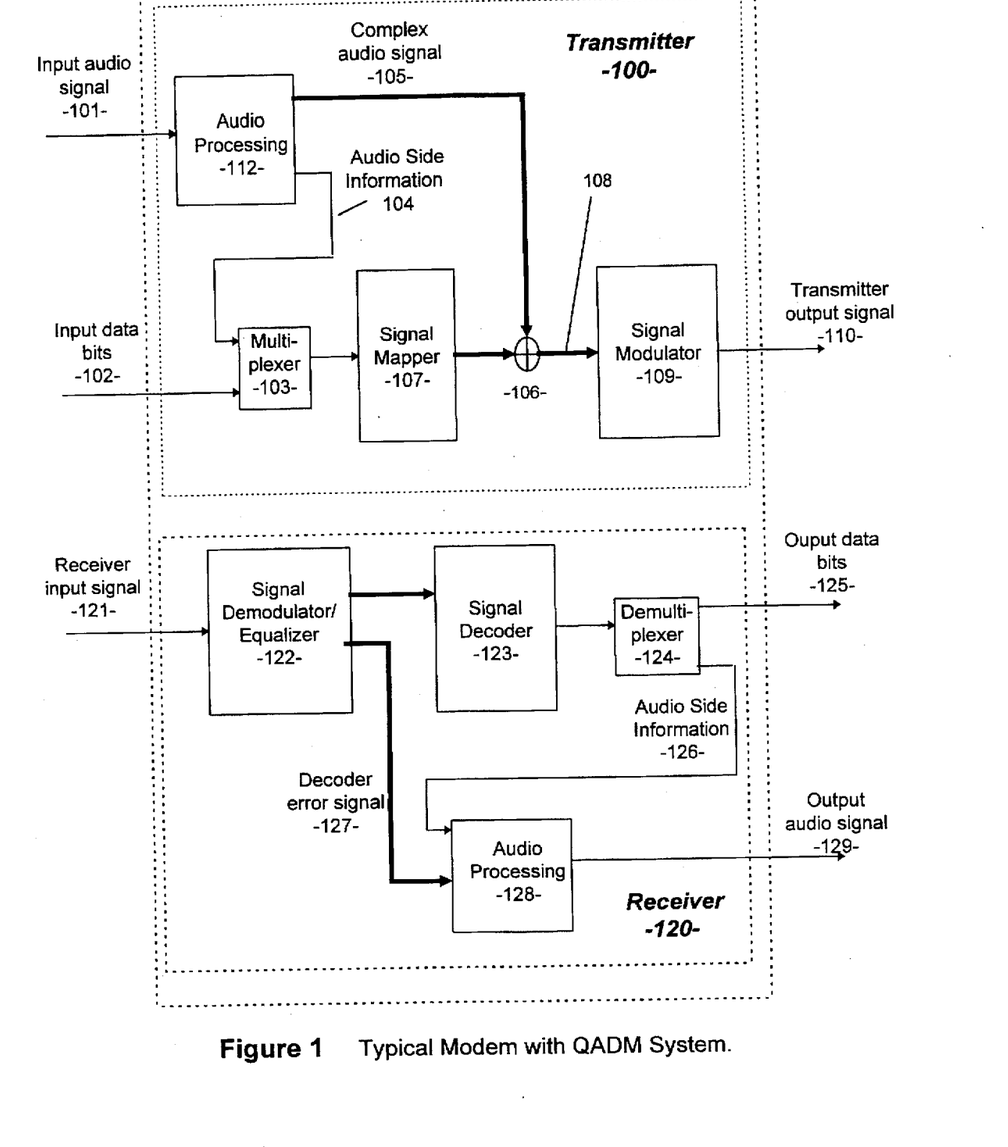
FIG. 1 is a simplified diagram showing a typical modem system using QADM.
Figure 2:
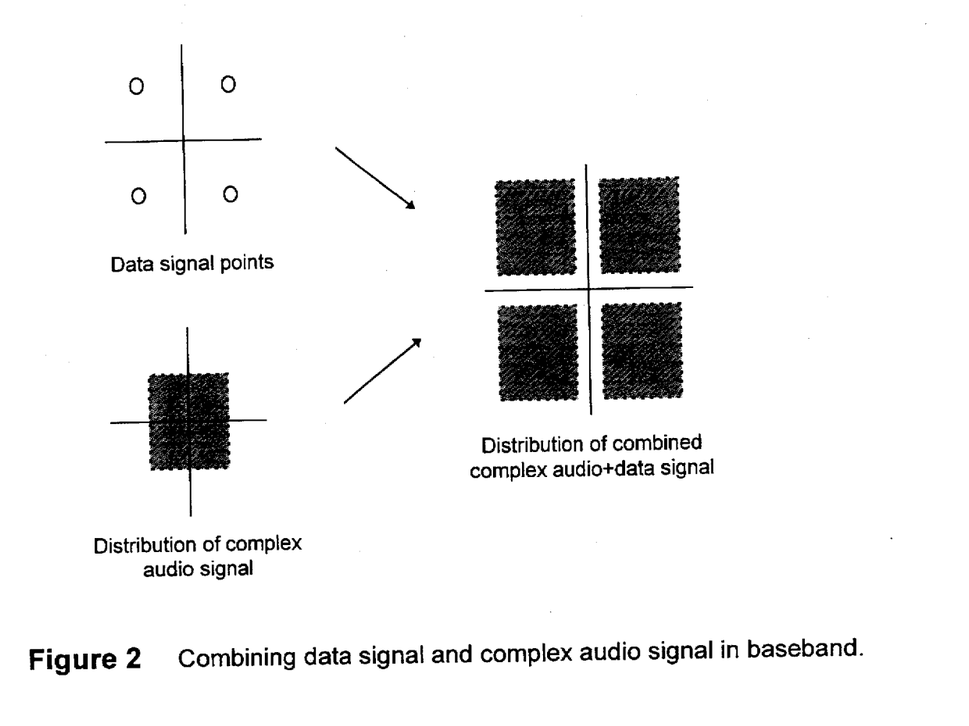
FIG. 2 illustrates a combined signal of both audio and data in a QADM system.

A typical QADM system is shown in FIG. 1. In the transmitter side 100, the input audio signal 101 is segmented into frames of size 10–30 ms each. Each frame of audio is analyzed and processed to remove correlation (for instance by linear predictive methods) and then scaled to a maximum amplitude. The correlation information and scale values 104 are multiplexed 103 with the input data bits 102 and transmitted as normal data. The scaled and decorrelated audio signal is converted to a complex signal 105, either by frequency translation to 0 Hz and filtering to make it a complex baseband signal, or simply by taking even samples to be the real part and odd samples to be the imaginary part. After possibly further processing the complex audio signal 105 is added 106 to the complex output of the data-signal mapper 107. The combined signal 108 will then become what is shown in FIG. 2. The combined signal is then modulated 109 as a regular data signal 110.

In the receiver 120, the received signal 121 is first demodulated and equalized 122, and a signal point quantizing (slicing) is performed. The quantized signal is decoded 123 into data bits, which are then demultiplexed 124 to separate the data bits 125 from the side-information bits 126. The difference between the signal before and after quantizing is calculated. This is normally the quantizing error 127 in data-only transmission. In QADM, this is the received audio component in addition to channel noise. Using the side-information 126, the received audio component is re-scaled and re-correlated, to yield an output audio signal 129.

2. The Effect of QADM on Modem Receivers.

As can be appreciated by those skilled in the art, the audio component of a QADM signal will appear as noise at the data receiver. Provided the signal (data signal) power is high enough relative to the "noise" (QADM signal) power, no data errors will occur and the audio will be decoded correctly. However, the signal coding normally assumes the noise is composed of Gaussian-distributed independent noise samples. It is further assumed that the noise signal does not affect receiver demodulation functions, such as gain control, timing and carrier recovery loops and equalization. Certain types of audio signals will, however, violate these assumptions and hence cause greater degradation than equivalent degrees of "random" noise.

Figure 5:
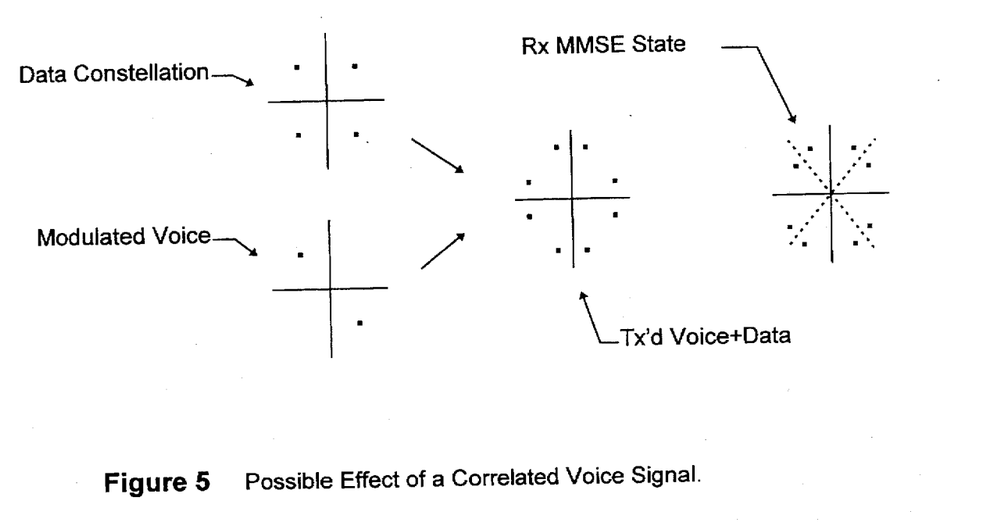
FIG. 5 illustrates the possible effect of a correlated audio signal.

Generally, the audio encoding functions at the transmitter side will remove most of the correlation in the audio signal. However, there will always be certain types of correlation which the encoding functions cannot capture, and the quantizing of the encoding parameters (e.g. LPC coefficients) will always leave some correlation. This can cause enough regularity in the signal that the receiver may find a false demodulation state giving less error than the correct state. An example is in V.61-type QADM modulation, where a tone at the audio demodulation frequency gets mapped to 2 points, in essence creating a fixed constellation with twice the number of points as the data-only constellation. Then, two points corresponding to different data points can become closer to each other than the two points corresponding to a single data point, as shown in FIG. 5.

This effect can cause a severe breakdown of the receiver. Apart from this effect, correlated signals can cause biases in various adaptive receiver functions.

SUMMARY OF THE PRESENT INVENTION

An audio processor for converting an input audio signal to complex audio samples for QADM processing by a modem for communication with a remote modem is disclosed. The audio process comprises a decorrelator for processing the input audio to generate a residual signal, an adaptive scaler for adaptively scaling the long-term residual signal to generate a scaled residual signal, a randomizer for phase-randomizing the scaled residual signal to generate a complex signal with randomized phases, and a limiter for limiting the complex signal with randomized phases, such that the complex signal is transmitted by the modem to a remote modem.

BRIEF DESCRIPTION OF THE DRAWINGS

Additional objects, features and advantages of the present invention will become apparent to those skilled in the art from the following description, wherein.

DETAILED DESCRIPTION OF THE PREFERRED EMBODIMENT

An apparatus and method for optimized simultaneous audio and data transmission using QADM with phase randomization is disclosed. In the following description, numerous specific details are set forth in order to provide a thorough understanding of the present invention. It should be understood, however, by those skilled in the art that these details are not required to practice the present invention. In other instances, well known circuits, methods and the like are not set forth in detail to avoid unnecessarily obscuring the present invention.

A solution in accordance with the present invention to the aforementioned problem is to add a "random" phase rotation of the audio component in the baseband. This results in a more uniform distribution around the original data point independent of the audio signal, and in almost all cases, at no cost.

It should be noted that the term "random" indicates that the phase rotation has certain characteristics that would be produced if the phase rotation were actually randomly selected as independent samples of a uniform distribution. In practical implementations, it may suffice to select a finite sequence of phases and repeat it continuously. Thus the sequence is actually predetermined and fixed, but can be reasonably assumed to have been selected from an actual random sequence, and would be considered a typical sample thus selected. The important characteristic is that the gains that would be observed with a truly random sequence are preserved with this pseudo-random sequence.

Figure 3:
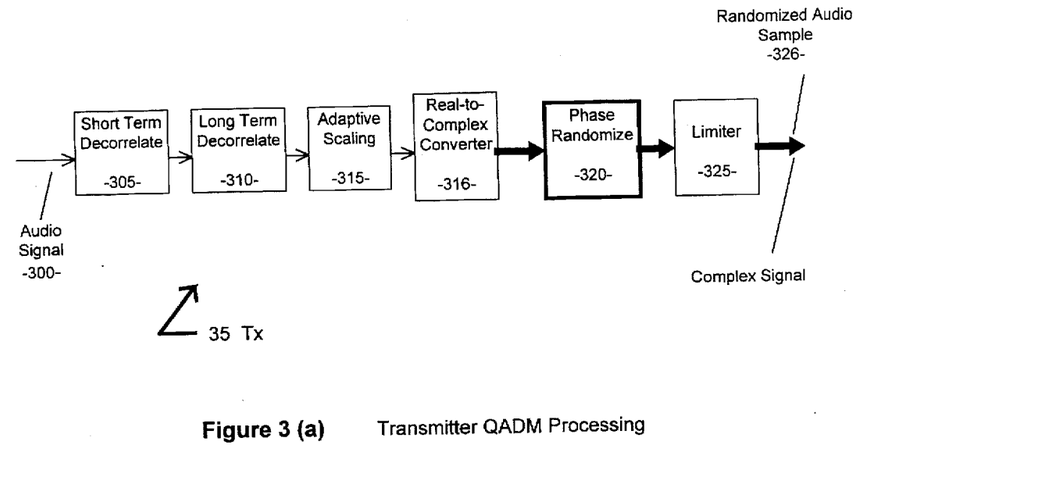
FIGS. 3(a) and 3(b) illustrates the audio processing unit with a randomizer and a derandomizer, respectively.
FIGS. 3(c) and 3(d) illustrates the transmitter and receiver QADM processing for V.61 configurations, respectively.

For audio processing 112 of the audio signal 300 on the transmitter side 35, the solution in accordance with the present invention involves modifying the QADM audio processing as follows: a linear predictive coding unit 305 (short-term decorrelation), a pitch prediction unit 310 (long-term decorrelation), an adaptive scaling unit 315, a real-to-complex converter 316, a phase randomizer unit 320 and a limiter 325 as shown in FIG. 3(a). It should be noted that the real-to-complex converter 316 is also called a "1D-to-2D" router in the draft specifications for the V.34Q specifications. Those skilled in the art will appreciate that the short-term decorrelation and long-term decorrelation units are sometimes simply referred to as one "decorrelation" unit.

For audio processing 128 on the receiver side 30, to accommodate the received signal which has been transmitted with randomization, the audio processing should comprise a derandomizer unit, a "complex-to-real" converter 352, an adaptive unscaling unit 355, a pitch prediction unit 360 (long-term recorrelation) and a linear predictive coding unit 365 (short-term recorrelation) before the reconstructed output audio signal is generated 370 as shown in FIG. 3(b).

Figure 3C:
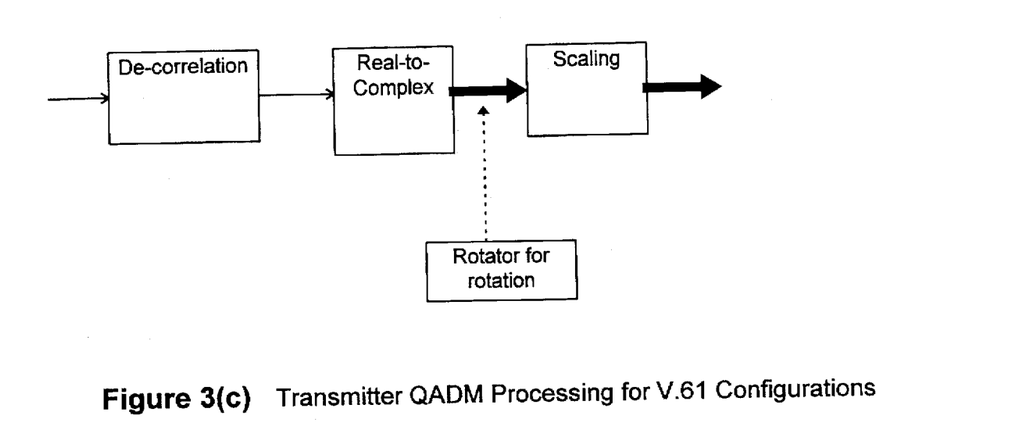
Figure 3D:
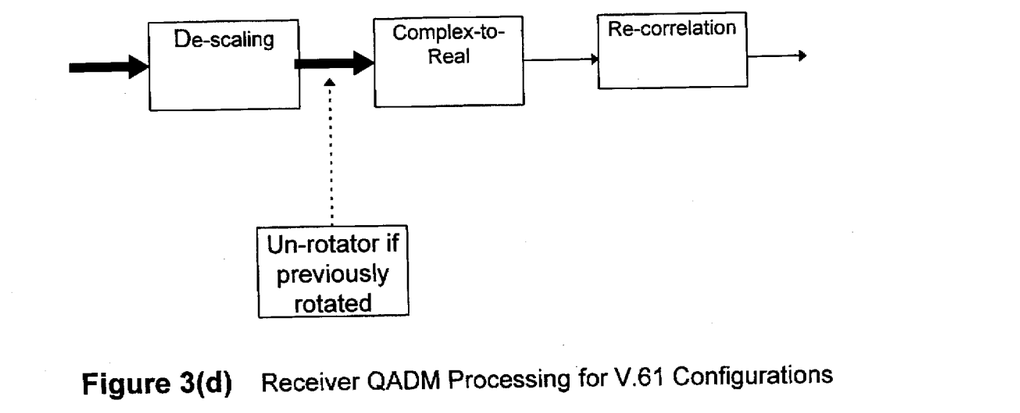

An alternative configuration for V.61 is shown in FIGS. 3(c) and 3(d). In this case, the real-to-complex conversion is implicitly performed with a frequency shift from passband to baseband. The output signal is at a sample rate greater than or equal to 2/T, typically 3/T, where 1/T is the symbol rate of the modem data signal. The signal spectrum in the range $(f_c-1/2T)$ to $(f_c+1/2T)$, where "$f_c$" is a suitably chosen center frequency, is shifted to the range $-1/2T$ to $1/2T$, then low-pass filtered to produce a complex baseband signal with sample rate 1/T as shown in FIG. 4(c). FIG. 4(d) shows the corresponding receiver operation, where the baseband signal is interpolated to a sample rate greater than or equal to 2/T, typically 3/T, then shifted in frequency to the range of $(f_c-1/2T)$ to $(f_c+1/2T)$. For V.61 configurations, a randomized phase rotation would be applied to the signals between this real-to-complex conversion and the scaling operation (as shown in FIG. 3(c)). Correspondingly, the receiver un-rotation would be applied to the signals between the inverse scaling and complex-to-real conversion.

Figure 4A:
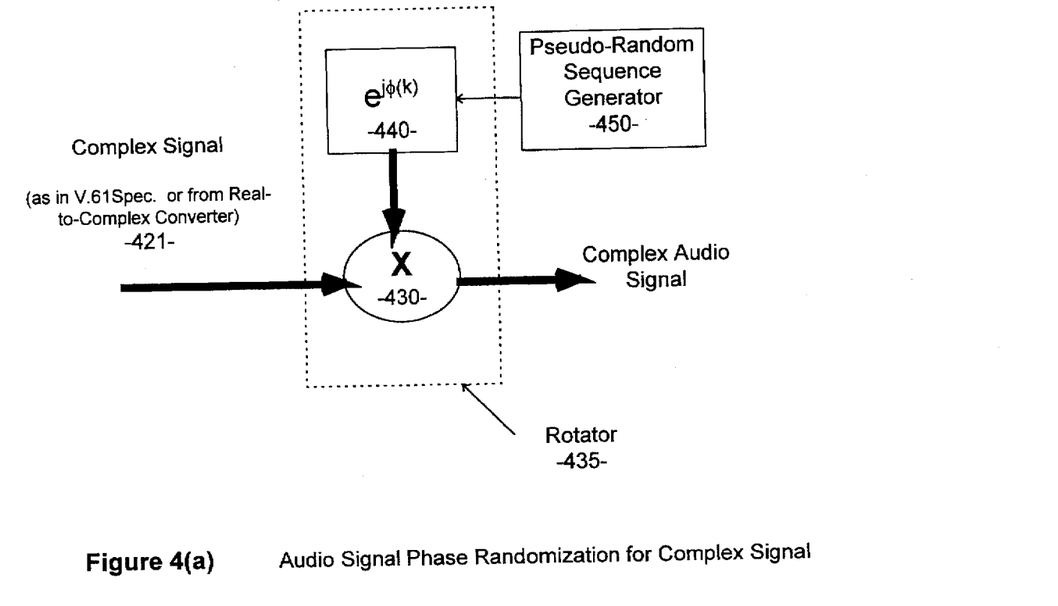
FIG. 4(a) illustrates a simplified phase randomization methodology.

FIG. 4(a) illustrates a simplified block diagram for the phase randomization methodology. A complex sample 421, whether it is the complex signal as in V.61 or the complex signal after the "real-to-complex" converter 316 as in V.34Q, is multiplied by a signal 440 characterized by $e^{j\phi(k)}$, where $\phi(k)$ is the pseudo-random phase sequence. The pseudo-random phase sequence 450 may be a predetermined sequence of some kind, or generated using a pseudo-random bit generator.

Figure 4B:
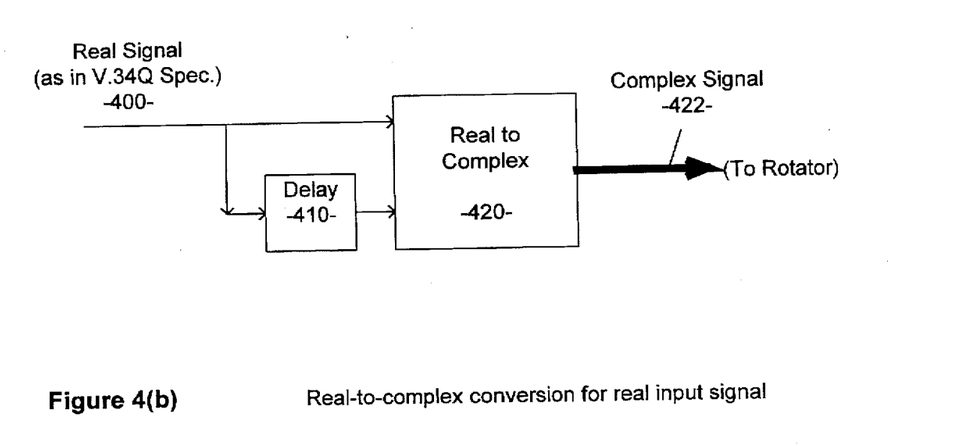
FIG. 4(b) illustrates a real-to-complex conversion for real input signals for V.34Q specifications.
Figure 4C:
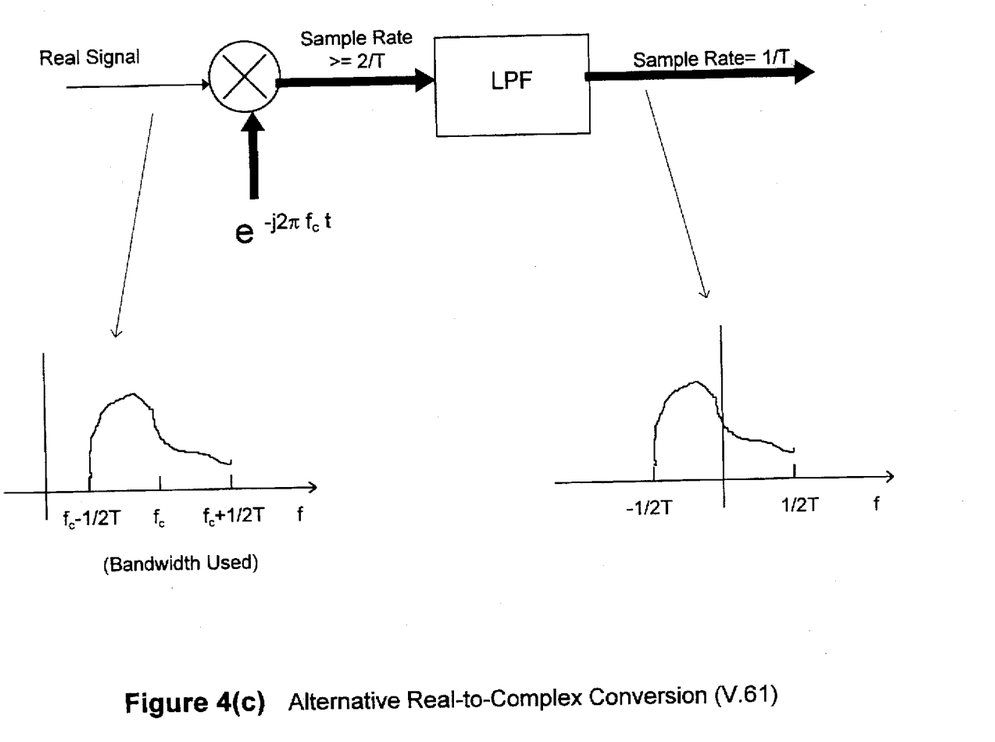
FIGS. 4(c) and (d) illustrate real-to-complex and complex-to-real conversions for V.61 configurations, respectively.
Figure 4D:
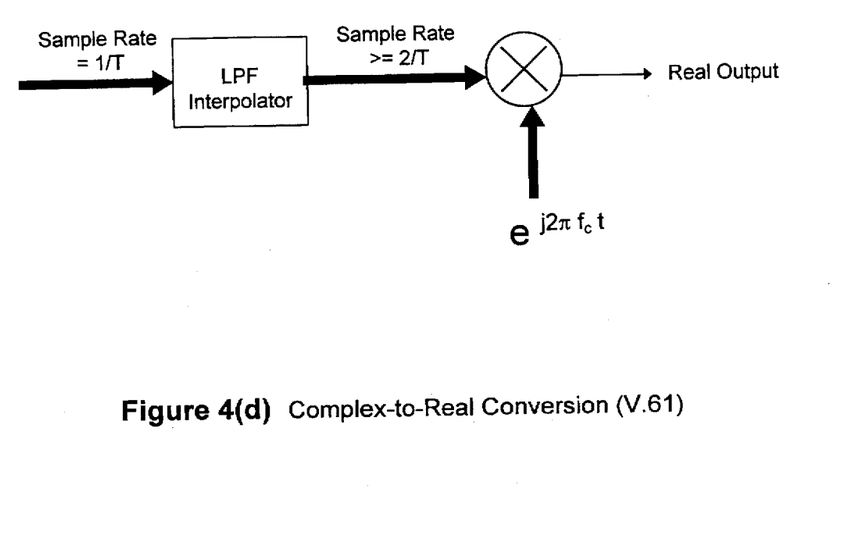

As shown in FIG. 4(b), for a real audio signal sample 440, it is first paired with its consecutive sample, through a delay unit 410, to form one complex sample 421 by way of a real-to-complex unit 420. Again, this would not be the case for the configuration according to the V.61 specifications. The complex signal 422 thus generated can then be rotated as shown in FIG. 4(a).

As will be appreciated by those skilled in the art, a simple 90 degree rotation, even if it is very well randomized, will not be of help in most cases. The data constellations are generally highly symmetric under 90 degree rotations. In most cases, random 90 degree rotations would simply alter the error event itself, instead of preventing it. As can be appreciated by those skilled in the art, the finer the rotational increment, the better. However, in order to distribute the points evenly around the data signal point, there must be large phase increments as well.

According to the present invention, a simple method of accomplishing the goals of the phase randomization is to base the randomization on a pseudo-random binary sequence, where a "0" would cause no rotation, and a "1" causes a (90+x) degree rotation, where "x" is a number between 5 and 40 degrees. The 90 degree component would distribute the points around the circumference, whereas the "x" would "fill in the gaps". A 2-bit sequence could also be used, but then it is just as good to use the whole content of a n-bit register that generates a pseudo-random binary sequence to multiply a phase of $2\pi/2^n$. An example would be the following, as illustrated in FIG. 6, where the polynomial $P(Z)=1+Z^{-1}+Z^{-7}$ is used to generate the sequence in the following manner:

$$x_0(k+1) = x_0(k) \oplus x_6(k)$$
$$x_i(k+1) = x_{i-1}(k), i = 1, 2, \ldots, 6$$

$$\phi(k) = 2\pi \sum_{i=0}^{6} x_i(k) \cdot 2^{-(i+1)}$$

Figure 6:
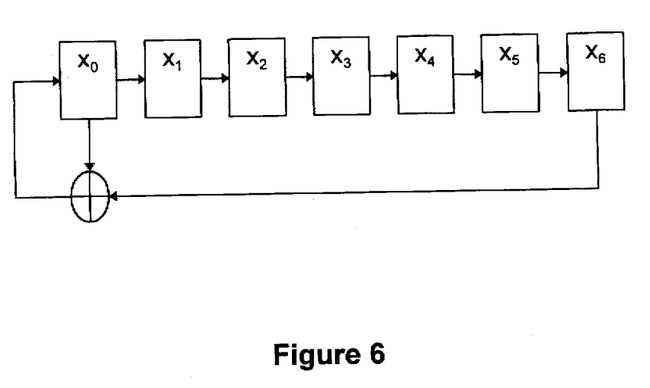
FIG. 6 illustrates a 64-phase sequence generator using a shift register.

As shown in FIG. 6, a shift register normally used to generate a binary pseudo-random sequence of length 127 can be used to generate a sequence of up to 64 different random phases. Only the first half of the sequence should be used since there is some loss of "randomess" when the shift register builds back to the all-1 state. The 2-dimensional audio component is thus rotated by $\phi(k)$. In the receiver, the opposite rotation is performed based on the same sequence.

The phase sequence $\phi(k)$ may also be chosen to do an encryption mapping on the audio signals. The transmitter and the receiver can mutually agree, according to methods well known in the art, on a bit sequence based on prior information or exchange of encryption "keys." In its simplest form, the encryption method could be used to encode a sequence of 1's, and the output used to modify a regular pseudo-random sequence. In case of the above example in FIG. 6, seven bits could be taken from the encryption sequence and exclusive-OR'd with each phase value to produce a pseudo-random encrypted phase sequence.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden pans, a nail and a screw may be equivalent structures.

What is claimed is:

1. A subsystem for QADM processing of QADM transmissions of audio signals for combining with data signals by a modem for communication with a remote modem, comprising:

real/complex conversion means for converting said audio signals into a complex signal;

randomizing means coupled to said real/complex conversion means for phase-randomizing said complex signal to generate a randomized complex signal, for combination with said data signals.

2. A subsystem according to claim 1, further comprising:

decorrelating means coupled to said real/complex conversion means for processing said audio signals to generate a residual signal, which is then input to said real/complex conversion means.

3. A subsystem according to claim 2, further comprising:

scaling means coupled to said decorrelating means for scaling said residual signal either before or after said real/complex conversion means.

4. A subsystem according to claim 3, further comprising:

limiting means coupled to said scaling means for limiting said scaled residual signal.

5. A subsystem according to claim 2, further comprising:

scaling means coupled to said randomizing means for scaling said randomized complex signal.

6. The subsystem according to claim 1, wherein said real-to-complex converting means comprises:

delay means adapted to receive said audio signals prior to said real/complex conversion means for generating delayed audio signals;

converting means coupled to said delay means for converting a pair of said audio signals and said delayed audio signals into a complex signal for said randomizing means to phase randomize.

7. The subsystem according to claim 1, wherein said randomizing means comprises:

sequence generating means for generating a pseudo-random phase sequence;

rotating means coupled to said sequence generating means and to said real-to-complex means, for rotating said first complex signal to generate said complex audio samples.

8. The subsystem according to claim 7, wherein said rotating means rotates by multiplying said first complex signal with a predetermined signal of $e^{j\phi(k)}$, where $\phi(k)$ is said pseudo-random phase sequence.

9. The subsystem according to claim 8, wherein said pseudo-random phase sequence is defined by a polynomial expressed as $P(Z)=1+Z^{-6}+Z^{-7}$.

10. The subsystem according to claim 8, wherein said pseudo-random phase sequence is defined by a polynomial expressed as $P(Z)=1+Z^{-1}+Z^{-7}$.

11. The subsystem according to claim 8, wherein said pseudo-random phase sequence comprises a shift register, the contents of which control said rotating means.

12. The subsystem according to claim 8, wherein said pseudo-random phase sequence comprises a predetermined sequence of randomly selected phases.

13. The subsystem according to claim 8, wherein said pseudo-random phase sequence comprises a predetermined repeated sequence of randomly selected phases.

14. The subsystem according to claim 13, wherein said predetermined repeated sequence comprises randomly selected phases.

15. The subsystem according to claim 8, wherein said pseudo-random phase sequence is further modified by an encryption method.

16. A transmitter for a modem using QADM for simultaneous communication of input audio signals and input data signals, comprising:

audio processing means for processing said input audio signals and generating complex audio signals and audio side information, comprising:

decorrelating means for processing said input audio to generate a residual signal;

real/complex converting means for converting the residual signal to a complex residual signal;

adaptive scaling means for adaptively scaling said complex residual signal to generate a scaled residual signal;

randomizing means for phase-randomizing said scaled residual signal to generate a complex signal with randomized phases;

limiting means for limiting said complex signal with randomized phases to generate a complex audio signal;

multiplexing means for receiving said audio side information and said input signals to generate a multiplexed signal;

signal mapping means coupled to said multiplexing means for receiving said multiplexed signal and generating a mapped signal;

combining means coupled to said signal mapping means and said audio processing means for combining said complex audio signal with said mapped signal to generate a combined signal;

signal modulating means for receiving said combined signal and modulating said combined signal for transmission by said modem to a remote modem.

17. The transmitter according to claim 16, wherein said randomizing means comprises:

sequence generating means for generating a pseudo-random phase sequence;

rotating means coupled to said sequence generating means and to said real-to-complex means, for rotating said first complex signal to generate said complex audio samples.

18. The transmitter according to claim 17, wherein said rotating means rotates by multiplying said first complex signal with a predetermined signal of $e^{j\phi(k)}$, where $\phi(k)$ is said randomized phase sequence.

19. The transmitter according to claim 18, wherein said pseudo-random phase sequence comprises a predetermined sequence of randomly selected phases.

20. The transmitter according to claim 18, wherein said pseudo-random phase sequence is defined by a polynomial expressed as $P(Z)=1+Z^{-6}+Z^{-7}$.

21. The transmitter according to claim 18, wherein said pseudo-random phase sequence is defined by a polynomial expressed as $P(Z)=1+Z^{-1}+Z^{-7}$.

22. The transmitter according to claim 18, wherein said pseudo-random phase sequence comprises a shift register, the contents of which controls said rotating means.

23. The transmitter according to claim 18, wherein said pseudo-random phase sequence is further modified by an encryption method.

24. The transmitter according to claim 18, wherein said pseudo-random phase sequence comprises a predetermined repeated sequence of randomly selected phases.

\* \* \* \* \*